Figure 2A:
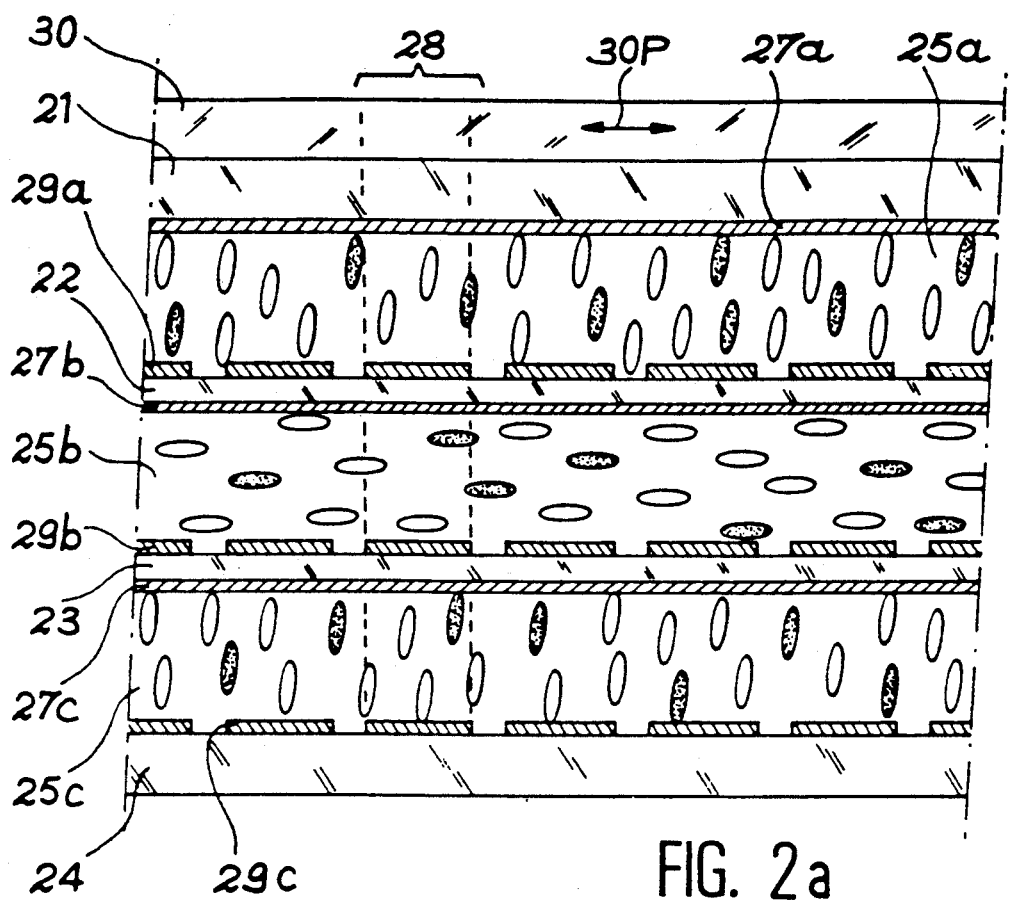

United States Patent [19]

Clerc et al.

[11] Patent Number: 5,015,074
[45] Date of Patent: May 14, 1991

[54] POLYCHROME SCREEN

[75] Inventors: Jean-Frederic Clerc, Saint-Egreve; Christine Ebel, Grenoble; Jean Dijon, Pont de Claix, all of France

[73] Assignee: Commissariat a l'Energie Atomique, Paris, France

[21] Appl. No.: 465,074
[22] PCT Filed: Jul. 5, 1988
[86] PCT No.: PCT/FR88/00359
  § 371 Date: Jan. 8, 1990
  § 102(e) Date: Jan. 8, 1990
[87] PCT Pub. No.: WO89/00300
  PCT Pub. Date: Jan. 12, 1989

[30] Foreign Application Priority Data

Jul. 7, 1987 [FR] France ................. 87 09641

[51] Int. Cl.⁵ .................................. G02F 1/13
[52] U.S. Cl. ..................... 350/339 F; 350/334; 350/335
[58] Field of Search ............ 350/339 F, 335, 349, 350/334

[56] References Cited

U.S. PATENT DOCUMENTS

| | | | |
|---|---|---|---|
| 4,460,248 | 7/1984 | Shirai | 350/335 |
| 4,581,608 | 4/1986 | Aftergut et al. | 350/339 F X |
| 4,610,507 | 9/1986 | Kamamori et al. | 350/335 |
| 4,697,886 | 10/1987 | Ito et al. | 350/336 |
| 4,902,103 | 2/1990 | Miyake et al. | 350/336 |
| 4,917,464 | 4/1990 | Conner | 350/335 |
| 4,957,350 | 9/1990 | Ito et al. | 350/336 |

FOREIGN PATENT DOCUMENTS

| | | |
|---|---|---|
| 0089378 | 9/1983 | European Pat. Off. . |
| 2561020 | 9/1985 | France .............. 350/339 F |
| 8605282 | 9/1986 | World Int. Prop. O. . |

Primary Examiner—Stanley D. Miller
Assistant Examiner—Ron Trice
Attorney, Agent, or Firm—Oblon, Spivak, McClelland, Maier & Neustadt

[57] ABSTRACT

The invention relates to a polychrome screen comprising alternating regions (40A, 40B) of a first (A) and a second (B) dichroic display materials placed between first and second insulating walls (31, 33) and alternating regions (42B, 42C) of a second (B) and a third (C) dichroic display materials placed between the second and third insulating walls (33, 35); each region of the first material of the first layer being superimposed both on a region of the second material of the second layer and part of a region of the third material of the second layer and each region of the second material of the first layer is superimposed on the other part of the region of the third material of the second layer. The present invention more particularly applies to polychrome display cells with liquid crystals, such as those of the nematic or ferroelectric type, using both a multiplexed and non-multiplexed display mode.

12 Claims, 6 Drawing Sheets

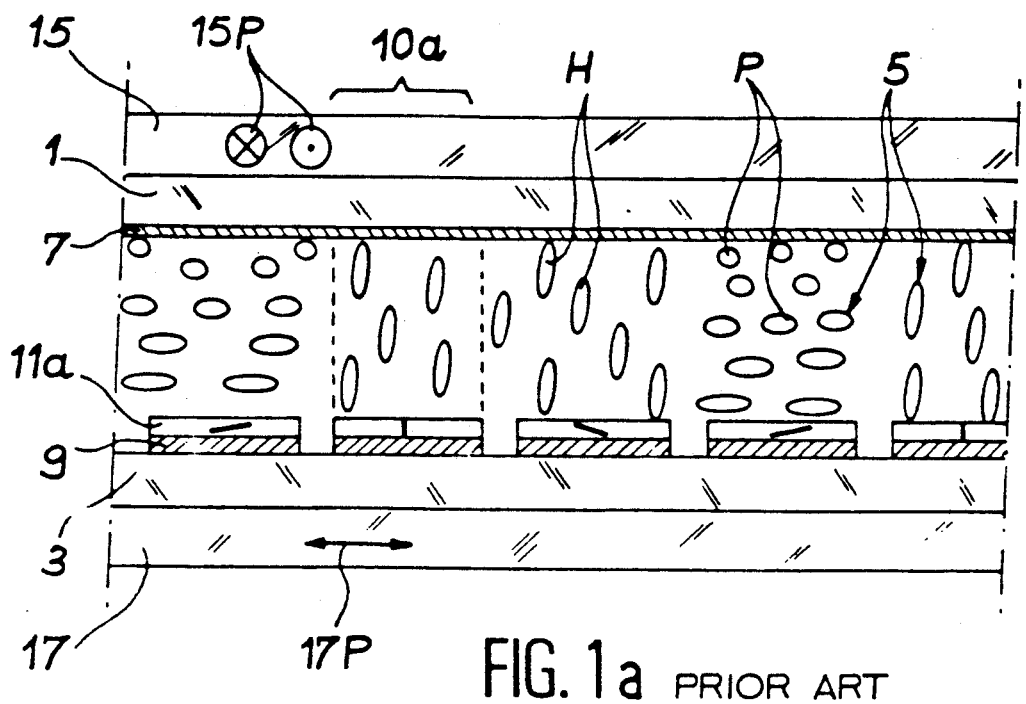
FIG. 1a PRIOR ART
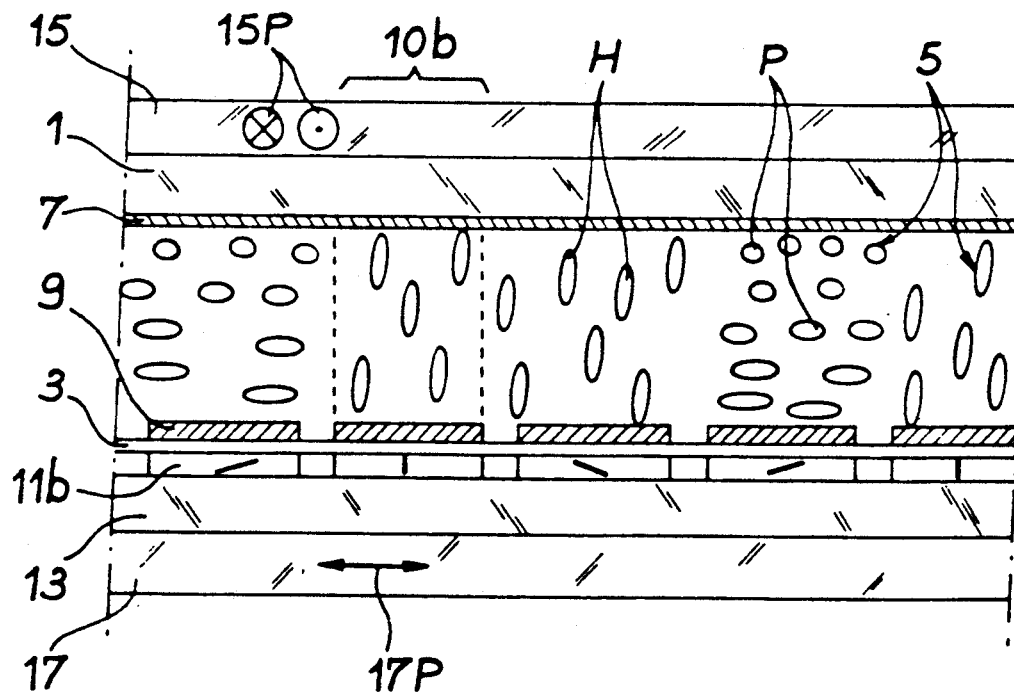
FIG. 1b PRIOR ART
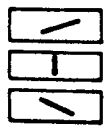

POLYCHROME SCREEN

The present invention more particularly relates to a matrix polychrome screen.

The invention particularly applies to the field of opto-electronics and specifically to light-emitting or liquid crystal display cells e.g. used for converting electrical information into optical information, for the real time processing of optical images and for analog display.

In known manner monochrome and polychrome screens comprise a display cell having at least a first and a second insulating walls facing one another and between which is placed a display material, whereof an optical characteristic can be modified.

This material can be a solid and/or a liquid and/or a liquid crystal. The optical property of this material can be an opacity, refractive index, transparency, absorption, diffusion, convergence, rotary power, birefringence, intensity reflected in a given solid angle, etc.

Throughout the remainder of the description, reference will be made in exemplified manner to a matrix display cell using as the display materials having a liquid crystal, but it must be understood that the invention is not limited thereto.

The optical characteristic of the liquid crystal is modified by an electric field, which is produced between electrodes placed respectively on the first and second walls of the cell facing the liquid crystal. In the case of a non-multiplexed display, these electrodes can be formed by a continuous electrode placed on one of the cell walls and raised to a reference potential and by point electrodes disposed on the other said wall, whereby the point electrodes are connected to row conductors and column conductors by transistors, such as thin film transistors. These electrodes can also be formed in the manner described in French patent application 2 553 218 by column electrodes placed on one of the cell walls and by point electrodes disposed on the other cell wall, the point electrodes being connected to row conductors and to a reference potential by transistors, such as thin film transistors.

In the case of a multiplexed display, these electrodes can be formed by column electrodes placed on one of the cell walls and by row electrodes placed on the other said wall, the row and column electrodes crossing one another.

An elementary image point of a cell, incorporating a display material placed between two insulating walls, is consequently defined by a capacitor, whose armatures or coatings are constituted in the case of a non-multiplexed display by a point electrode and the facing part of the continuous electrode, or by a point electrode and the facing part of a column electrode, and in the case of a multiplexed display by the facing parts of a row electrode and a column electrode. The display material placed between the coatings constitutes the capacitor dielectric.

In known manner, there are two main types of polychrome screens, namely additive polychrome screens and subtractive polychrome screens. Additive polychrome screens use colored filters disposed either inside, or outside a display cell incorporating a single display material constituted by a liquid crystal. The subtractive polychrome screens use several superimposed display materials within a display cell, each display material being constituted by a liquid crystal mixed with a different colorant or dye. Throughout the remainder of the text a display material incorporating a dye will be referred to as a dichroic display material.

The liquid crystal used in the previously described polychrome screens is of the nematic type.

Nematic liquid crystal molecules are said to have a homotropic H configuration when their longitudinal axis is perpendicular to the plane of the cell walls and are said to have a planar P configuration when their axis is parallel to the plane of the walls. The configuration of the liquid crystal molecules placed between two electrodes of a cell is dependent on a the nature of the liquid crystal and the electric field applied between these two electrodes.

FIGS. 1a Zand 1b diagrammatically show an additive polychrome display cell respectively having the colored filters 11a, 11b inside and outside the cell. These drawings show a first and a second insulating, transparent wall 1, 3, between which is placed a helical nematic liquid crystal layer 5. On the inner faces of said walls 1, 3 are respectively placed transparent electrodes 7, 9, e.g. respectively constituted by a continuous electrode 7 and a point electrode 9.

Moreover, outside the cell is placed on the wall 1 a linear polarizer 15 and above wall 3 is positioned a linear polarizer 17. Polarizers 15 and 17 cross one another, direction 15P of polarizer 5 being e.g. parallel to the axis of the liquid crystal molecules in planar configuration located on wall 1, whilst direction 17P of polarizer 17 is parallel to the axis of the liquid crystal molecules in planar configuration located on wall 3.

Polarizer 17 makes it possible to render linear the incident light penetrating the cell, e.g. from wall 3, whilst polarizer 15 makes it possible to absorb the incident radiation when the molecules of the liquid crystal are in homeotropic configuration.

In FIG. 1a, polarizer 17 is located on wall 3 and colored filters 11a are positioned within the cell on electrode 9, in such a way that each filter faces a liquid crystal zone positioned between a point electrode 9 and the continuous electrode 7. Each point electrode 9 and the part of the continuous electrode 7 facing said electrode 9 from the coatings of a capacitor, whose liquid crystal 5 between said electrodes forms the dielectric. Each capacitor constitutes an elementary image point 10a of the polychrome screen. In the case of a trichrome screen, an image point of the screen is constituted by three adjacent elementary image points 10a, each of them being associated with a different filter, e.g. red, green and blue.

The association of a red filter with the liquid crystal molecules in planar configuration makes it possible to absorb the radiation corresponding to blue and green and to transmit the radiation corresponding to red. The association of a green filter with the liquid crystal molecules in planar configuration makes it possible to absorb the radiation corresponding to red and blue and transmit the radiation corresponding to green. The association of a blue filter with the liquid crystal molecules in planar configuration makes it possible to absorb the radiation corresponding to red and green and transmit the radiation corresponding to blue.

In order to display one of the three colors blue, red or green at an image point, the liquid crystal molecules of the image point associated with the filter whose color is to be displayed, must be in a planar configuration and the molecules of said point associated with the two other filters must have a homeotropic configuration. In order to display a white image point, the liquid crystal molecules associated with the three filters of the image point must be in a planar configuration, whilst for displaying a black image point, the liquid crystal molecules associated with the three filters of the image point must be in a homeotropic configuration.

By combination of the three colors and by the independent control of each of them, the trichrome nature makes it possible to obtain all the shades of the visible spectrum by independently modulating the intensity of these colors.

In FIG. 1b, the colored filters 11b are located outside the cell between the outer face of wall 3 and a transparent wall 13, each filter facing an elementary image point 10b constituted by a point electrode 9, the part of the continuous electrode 7 facing point electrode 9 and the liquid crystal zone placed between these electrodes. EAch image point of the screen is also constituted by three adjacent elementary image points, each of the latter facing three different filters 11b (e.g. red, green and blue). As the filters are outside the cell, wall 3 is advantageously less thick than that shown in FIG. 1a, in order to minimize parallax effects. Moreover, in said drawing, polarizer 17 is placed on the outer face of wall 13.

Additive polychrome screens only use a single liquid crystal layer 5. However, in view of the fact that an image point is defined by three elementary image points, the luminous efficiency of such screens is not satisfactory. Only a third of the image point is used for each display of blue, green or red in an image point.

The limited luminosity of such screens leads to a significant energy consumption, which does not make it possible to use these screens in the reflective mode. Moreover, the small active surface of the screen for a given display leads to a definite discontinuity in the appearance of the display.

FIG. 2a diagrammatically shows a subtractive polychrome display cell. The latter comprises three superimposed dichroic display materials 25a, 25b, 25c, respectively placed between the insulating and transparent walls 21 and 22, 22 and 23, 23 and 24. These liquid materials 25a, 25b, 25c are constituted by a nematic liquid crystal mixed with a dye. Walls 22 and 23 have thicknesses smaller than those of walls 21 and 24 in order to minimize parallax effects. For example, walls 22, 23 have a thickness equal to or greater than approximately 100 $\mu$m, whilst walls 21, 24 have a thickness of approximately 1 mm, the display materials 25a, 25b, 25c having a thickness of approximately 10 $\mu$m.

Moreover, a linear polarizer 20 is placed outside the said cell, e.g. on wall 21. The polarization direction 30P is parallel to the axis of the liquid crystal molecules in planar configuration.

Electrodes are placed on the inner faces of said walls 21, 22, 23 and 24. Thus, e.g. on the facing faces of walls 21 and 22 are respectively arranged a continuous electrode 27a and point electrodes 29a. On the facing faces of walls 22, 23 are respectively arranged a continuous electrode 27b and point electrodes 29b. On the facing faces of wall 23, 24 are respectively arranged a continuous electrode 27c and point electrodes 29c.

The dye molecules used in a dichroic display material can be entrained by the orientation of the liquid crystal molecules. The absorbence of the dichroic display material varies as a function of the orientation of said dye molecules. Thus, when the dye molecules are in a planar configuration, the dichroic display material is absorbent and when they are in the homeotropic configuration, the display material permits the passage of light. The different dyes used in the three display materials 25a, 25b, 25c makes it possible to absorb different wavelengths of light, when the molecules corresponding to said materials are in planar configuration.

In this type of screen, each image point 28 is defined by the super-imposing of three capacitors, whose dielectrics are respectively constituted by the display materials 25a, 25b and 25c and whose coatings or armatures are respectively constituted by a point electrode 29a and the facing part of electrode 27a, by a point electrode 29b and the facing part of electrode 27c.

Figure 2B:
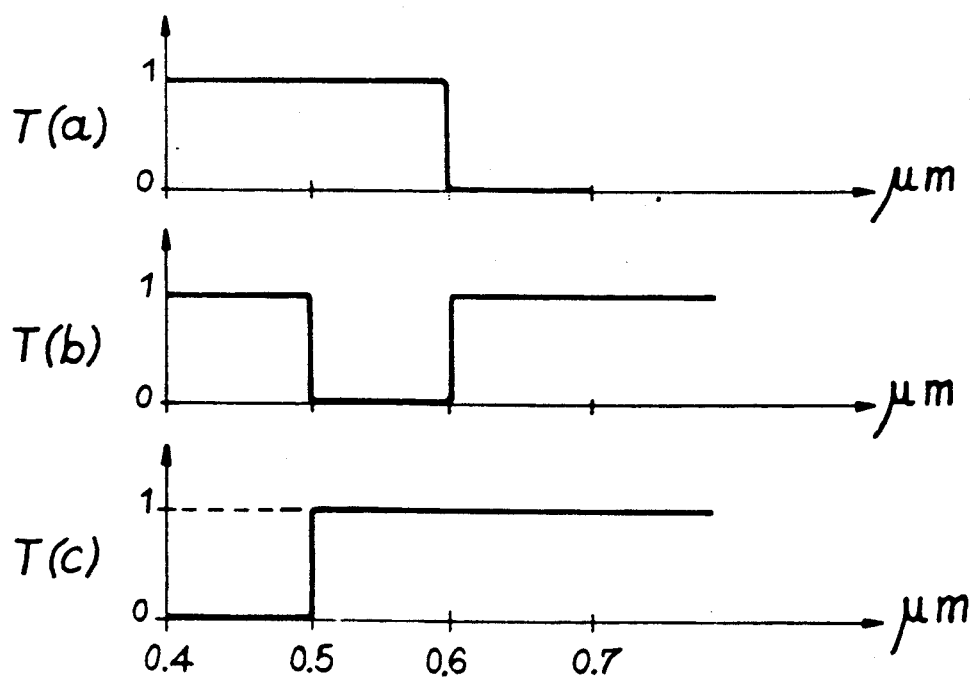

FIG. 2b shows in an ideal case the transmission curves T(a), T(b), T(c) of each of the dichroic display materials 25a, 25b, 215c as a function of their wavelengths, when the molecules of each of these materials are in planar configuration, or in other words when said materials are in the absorbent state.

These curves vary between the values 1 and 0. Value 1 corresponds to a transmission of wavelength and value 0 to an absorption of wavelengths. Moreover, the visible spectrum is broken down into a radiation of wavelength between 0.4 and 0.5 $\mu$m corresponding to blue, into a radiation of wavelength between 0.5 and 0.6 $\mu$m corresponding to green and a radiation of wavelength between 0.6 and 0.7 $\mu$m corresponding to red.

Thus, in an absorbent state the display material 25a (cf. T(a) FIG. 2b) permits the passage of radiation of wavelength below 0.6 $\mu$m and absorbs the radiation of wavelength exceeding 0.6 $\mu$m. Thus, display material 25a permits the passage of radiation corresponding to blue and green and absolute the radiation corresponding to red.

In an absorbent state, the display material 25b (cf. T(b) FIG. 2b) permits the passage of radiation of wavelength between 0.5 and 0.6 $\mu$m. Therefore material 25b permits the passage of radiation corresponding to blue and red and absorbs radiation corresponding to green.

In an absorbent state, the display material 25c (cf. T(c) FIG. 2b) permits the passage of radiation of wavelength higher than 0.5 $\mu$m and absorbs radiation of wavelength lower than 0.5 $\mu$m. Thus, material 25c permits the passage of radiation corresponding to green and red and absorbs radiation corresponding to blue.

Thus, for displaying a red image point, the corresponding molecules of materials 25b and 25c must be in planar configuration and corresponding molecules of material 25a in homeotropic configuration. For displaying a green image point, the corresponding molecules of materials 25a and 25c must be in planar configuration and the corresponding molecules of material 25b in homeotropic configuration. For the display of a blue image point, the corresponding molecules of materials 25a and 25b must be in planar configuration and the corresponding molecules of material 25c must be in homeotropic configuration.

When the molecules of materials 25a, 25b and 25c corresponding to an image point are all in planar configuration, all the wavelengths of the visible spectrum are absorbed (black image point). Conversely, when all the molecules of the materials 25a, 25b, 25c corresponding to an image point are in homeotropic configuration, all the wavelengths of the visible spectrum are transmitted (white image point).

Moreover, in the case where the molecules corresponding to an image point are in planar configuration for a single display material and in homeotropic configuration for the two other display materials, the transmitted wavelengths correspond to those transmitted by the material in the planar configuration, so that a two colors are superimposed.

Furthermore, by modulating the electric field between the different electrodes between a total absorption (value 0) and a total transmission (value 1), it is impossible to obtain all the shades of the visible spectrum for an image point.

In view of the fact that the elementary image points coincide with the image points, the luminous efficiency of this type of screen is better than that of additive screens and its display has a continuity of the colored characters.

However, a subtractive polychrome screen is more complex than an additive polychrome screen and requires the use of three display materials separated by walls, which leads to parallax effects despite their limited thickness. Moreover, the subtractive polychrome screens, through the superimposing of three display materials, have a limited brightness and therefore a high energy consumption, once again not permitting use in the reflective mode.

The invention therefore relates to a novel polychrome screen more particularly making it possible to obviate the disadvantages of the polychrome screens described hereinbefore and in particular having a better luminous efficiency and therefore a lower energy consumption than the additive and subtractive polychrome screens described hereinbefore. Therefore the polychrome screens according to the invention can be used both in the reflective and in the transmissive mode.

The invention therefore specifically relates to a polychrome screen, characterized in that it comprises alternating regions of a first and a second dichroic display material placed between a first and a second insulating wall and alternating regions of a third and a fourth dichroic display material placed between the second and third insulating walls, each region of the first material being superimposed both on a region of the third material and part of a region of the fourth material and each region of the second material is superimposed on the other part of a region of the fourth material, an image point of the screen being defined by the superimposing of three adjacent capacitors of a first group, whereof the dielectrics are constituted for two of them by the first material and for the third by the second material with three adjacent capacitors of a second group, whose dielectrics are constituted for one of them by the third material and for the two others by the fourth material, the coatings of the capacitors of the first and second groups being respectively constituted by electrodes placed on the facing faces of the first and second walls and by electrodes placed on the facing faces of the second and third walls.

Advantageously, the second and third display materials are identical.

Each elementary image point of said screen is consequently constituted by the superimposing of two capacitors, whose dielectrics are formed by two different dichroic display materials in place of three capacitors in the case of subtractive polychrome screens. Moreover, an image point of the polychrome screen according to the invention is defined on the basis of three adjacent elementary image points. Each elementary image point can have at least four states, namely a black state, a white state and two colored states, whereby each color can be obtained on two elementary image points instead of a single elementary image point, as in the case of additive polychrome screens.

Therefore, the polychrome screens according to the invention have a high brightness or luminosity corresponding to approximately ⅔ of the incident intensity and permitting a display both in the reflective and the transmissive mode.

Furthermore, the superimposing of two dichroic display materials instead of three display materials as in the case of subtractive polychrome screens makes it possible to reduce the parallax effects due to the different superimposings of materials achieved by means of walls.

Advantageously, the distribution of each display material between the corresponding walls of the screen has a comb shape, the distribution of the first and second materials being complimentary and the distribution of the third and fourth materials also being complimentary.

According to an embodiment of the polychrome screen according to the invention, each display material is constituted by a polymer incorporating bubbles containing a liquid crystal mixed with a dye. A display material of this type is e.g. described in SID (Society for Information Display), International Symposium Digest of Technical Papers 1985, p 68, session 6, by J. L. Fergason or Applied Physics Letters, p 4, vol. 48, 1986, by J. W. Doane, N. A. Vaz, B. G. Wu and S. Zumer.

According to a variant of the polychrome screen according to the invention, each display material is constituted by a liquid crystal mixed with a dye, a first tight wall member located between the first and second walls making it possible to separate the first and second display materials and a second tight wall member located between the second and third walls making it possible to separate the third and fourth display materials, a first and second sealing joint being respectively placed round the first and second walls and around the second and third walls.

The first and second wall members are respectively produced on the first or second walls and on the second or third walls above the electrodes using conventional processes such as photolithography. Thus, for example, these wall members are constituted by a polymerized resin, etched chemically or by plasma, as a function of the resin type used.

According to an embodiment of the polychrome screen according to the invention, the liquid crystal used is of the nematic type. A nematic liquid crystal is understood to cover liquid crystals of the nematic type, helical nematic type and nematic type mixed with a cholesteric compound.

Thus, in exemplified manner, with the screen according to the invention, it is possible to use the dichroic effect of either the Heilmeir-Zanoni or White-Taylor type. The Heilmeir-Zanoni dichroic effect requires a display material having a nematic liquid crystal and a dye.

When this material is placed between two electrodes, if the electric field established between the electrodes is adequate to excite the liquid crystal molecules, the liquid crystal molecules and the dye are in a planar configuration. THe display material is then absorbent. However, in the opposite case, the liquid crystal molecules and the dye have a homeotropic configuration. The display material is conductive, or in other words transmits the incident light. With this display material type, the absorbent state corresponds to an excited state and the conductive state to an unexcited state.

The absorbent state is understood to mean a state permitting the absorption of only part of the wavelengths of the incident light, whilst the conductive state relates to a state permitting the complete transmission of the wavelengths of the incident light.

When the display cell according to the invention uses such display materials, a polarizer must be associated with the cell.

The White-Taylor dichroic effect requires a display material having a nematic liquid crystal mixed with a cholesteric compound and a dye. When this material is placed between the two electrodes, if the electric field established between the two electrodes are adequate to excite the liquid crystal molecules, the liquid crystal molecules and the dye are in a homeotropic configuration, the display material being conductive. In the opposite case, the liquid crystal molecules and the dye are successively located in all directions and the display material is absorbent. With this display material type, the absorbent state corresponds to an unexcited state and the conductive state to an excited state.

When the display cell according to the invention uses such display materials, the latter requires no polarizer in view of the numerous directions taken by the molecules of the liquid crystal and the dye in the unexcited state. This polarizer-free cell has a better brightness than a cell with one or more polarizers.

In a White-Taylor cell, it is also possible to use a helical nematic liquid crystal mixed with a dye. However, in this case, the display cell requires two crossed polarizers.

Nematic liquid crystal molecules have a significant switching time, approximately $10^{-1}$s, between an absorbent state and a conductive state. Therefore preference is given with such a liquid crystal to a non-multiplexed display type, like those described hereinbefore.

According to a constructional variant of the polychrome screen according to the invention, the liquid crystal used is ferroelectric, or in other words it is inclined chiral smectic and e.g. of the chiral smectic C type.

An inclined chiral smectic liquid crystal is constituted by elongated chiral molecules arranged in layer form. In these layers, the molecules are inclined by an angle $\theta$ with respect to the normal to the layers and have a dipole moment $\vec{P}$ perpendicular to their longitudinal axis. For a smectic liquid crystal film of thickness equal to or below the pitch of the helix of the smectic and following an appropriate surface treatment of the walls between which is interposed said film, the liquid crystal layers are parallel to one another and perpendicular to the cell walls and the liquid crystal molecules and in planar configuration.

Thus, there are two possible stable molecular orientations. In one of these orientations, the longitudinal axis of the molecules forms an angle $-\theta$ with respect to the normal to the layers, whereas in the other the longitudinal axis of the molecules form an angle $+\theta$ with respect to the normal to the layers. When an electric field $\vec{E}$ is applied to such a liquid crystal, a high coupling is obtained between the molecular orientation (longitudinal axis of the molecules) and said electric field $\vec{E}$ due to the presence of the permanent dipole. This coupling is of the polar type, because the electric dipole is preferably oriented in a direction parallel to the electric field. The polarity change of the electric field consequently makes it possible to change the orientation of the electric dipole and therefore the orientation of the liquid crystal molecules passing from one stable state to another, said two stable states being separated by an angle $2\theta$.

A screen using ferroelectric liquid crystals is e.g. described in European patent application 32 362.

Advantageously, a polychrome screen according to the invention using a ferroelectric liquid crystal associated with dyes has a single polarizer. The latter is e.g. positioned in such a way that the incident light traverses the polarizer before penetrating the cell.

In the display cell according to the invention using a single polarizer, angle $2\theta$ is preferably equal to 90° C. Thus, the smaller the angle $2\theta$, the poorer the contrast between an absorbent state and a conductive state.

When the longitudinal axis of the ferroelectric liquid crystal molecules is parallel to the direction of the polarizer, the display material is absorbent and when it is perpendicular the display material is conductive.

In view of the fact that ferroelectric liquid crystals have the property of retaining their orientation outside the field, this type of screen requires no refreshing. Moreover, the switching speed between the two stable states of the ferroelectric liquid crystal molecules is fast, namely a few $\mu$s, so that it is advantageous to use with this liquid crystal type a multiplexed display like that described hereinbefore. However, it is obviously possible to used non-multiplexed displays.

According to an embodiment of the invention, in an absorbent state, the first material absorbs radiation corresponding to the green and red and transmits radiation corresponding to the blue, the second and third materials absorb radiation corresponding to the blue and green and transmit radiation corresponding to the red and the fourth material absorbs radiation corresponding to the blue and red and transmits radiation corresponding to the green.

Figure 3A:
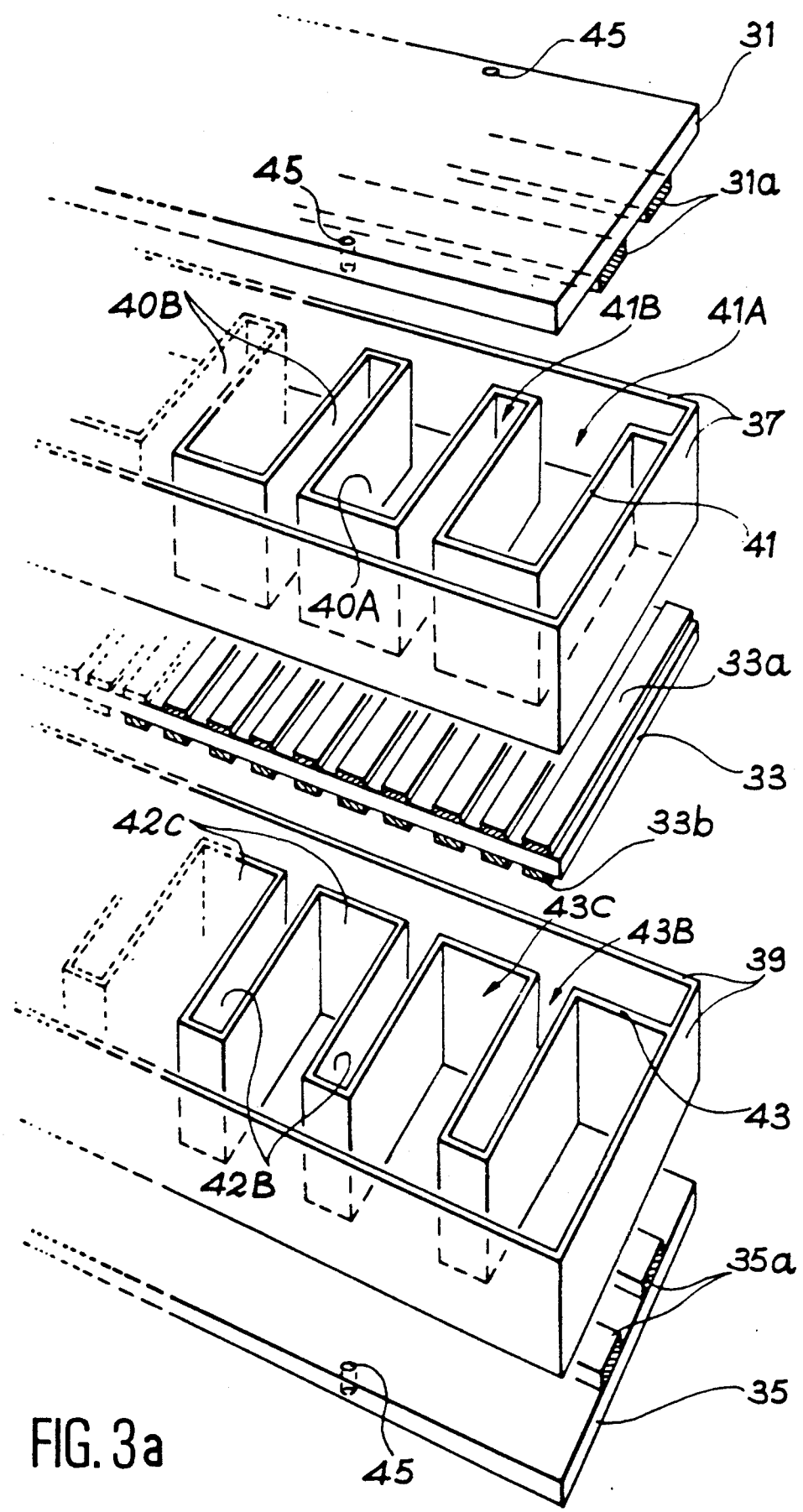
Figure 3B:
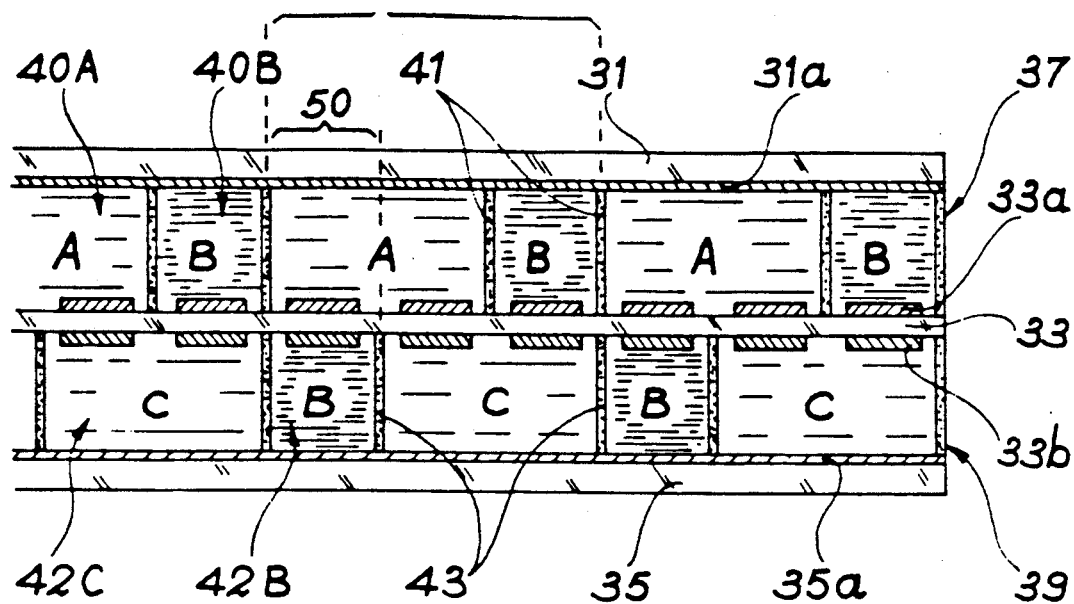
Figure 3C:
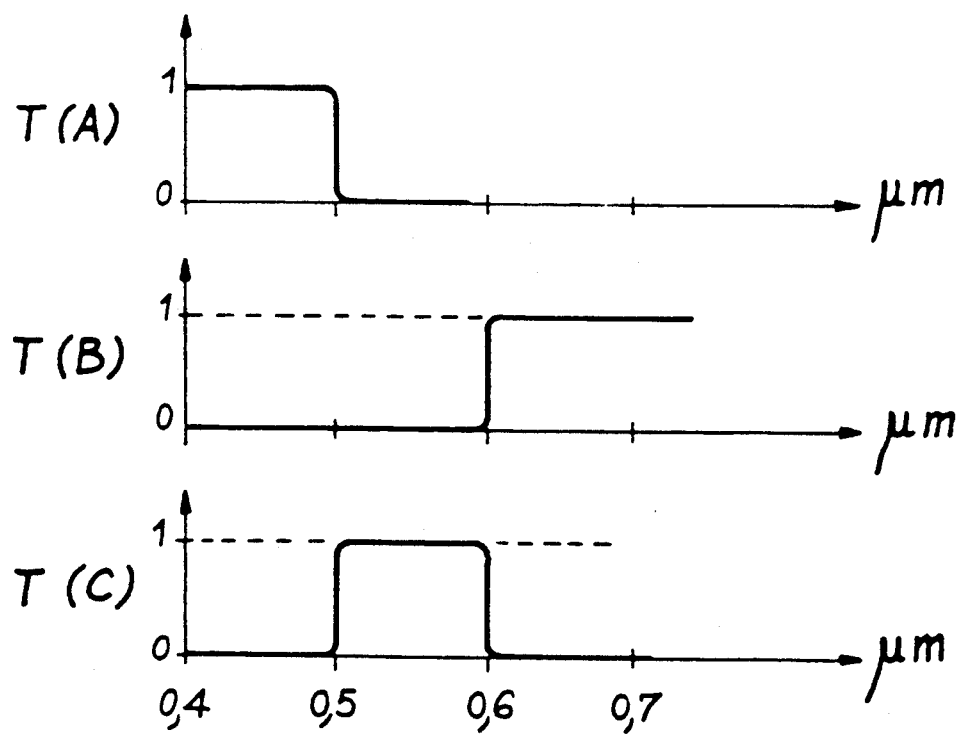
Figure 4:
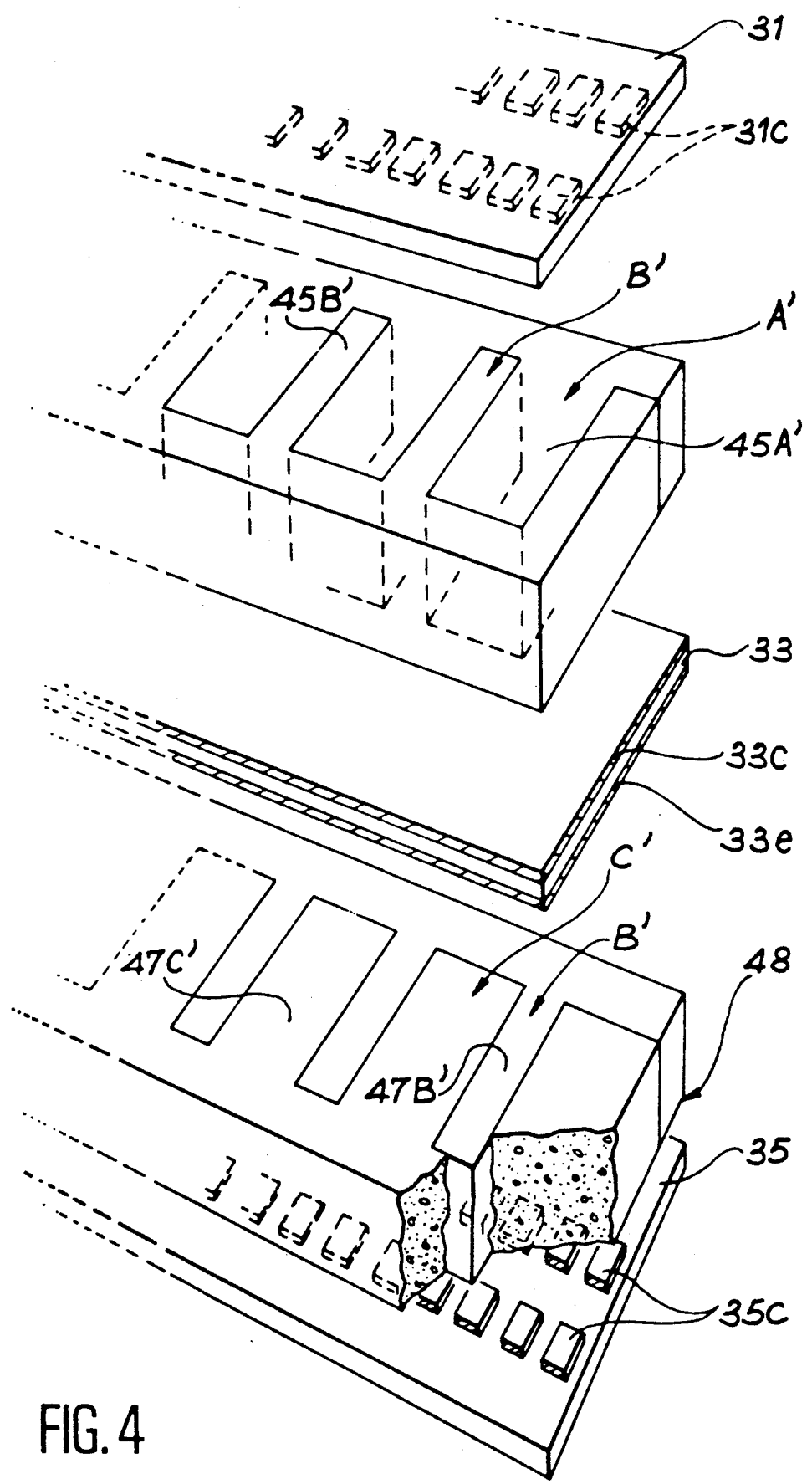
Figure 5:
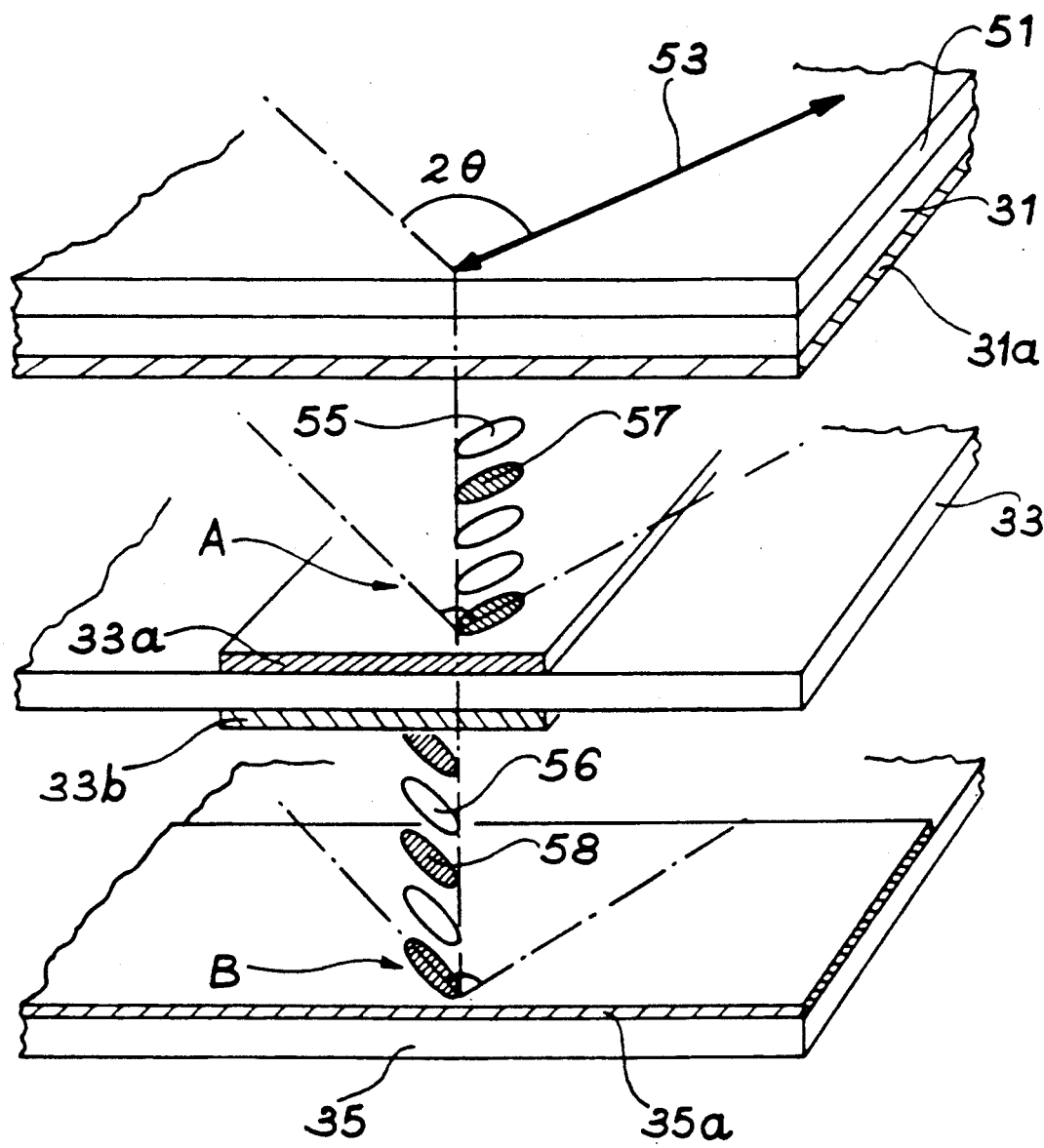

Other features and advantages of the invention can be better gathered from the following illustrative and non-limitative description with reference to FIGS. 1a to 5, wherein show:

FIGS. 1a and 1b, already described, diagrammatically and in section additive polychrome display cells. FIG. 2a, already described, diagrammatically and in section a subtractive polychrome display cell. FIG. 2b, already described, the transmission curves of dichroic display materials used in the cell shown in FIG. 2a for different wavelengths of the visible spectrum. FIG. 3a, diagrammatically an example of a display cell according to the invention, whereof each display material is constituted by a liquid crystal mixed with a dye and whose display is of the multiplexed type. FIG. 3b, diagrammatically and in section the display cell of FIG. 3a. FIG. 3c diagrammatically the transmission curves of an example of display materials used in a display cell according to the invention for the different wavelengths of the visible spectrum. FIG. 4 diagrammatically another example of a display cell according to the invention for which the display material is constituted by a polymer having bubbles containing a liquid crystal mixed with a dye and whose display is of the non-multiplexed type. FIG. 5 diagrammatically the two stable states of the ferroelectric liquid crystal molecules used in a display cell according to the invention associated with a single polarizer.

FIGS 3a and 3b diagrammatically and respectively show in exploded sectional form an example of a display cell according to the invention. The latter has three insulating walls 31, 33, 35. Between the facing faces and around the walls 31, 33 is placed a sealing joint 37, whilst between the facing faces and around walls 33 and 35 is placed a sealing joint 39.

Within the space created by joint 37 and walls 31, 33 is placed a wall member 41 for subdividing said space into two separate zones 41a, 41b, each of the said zones being shaped like a complimentary comb. Thus, the regions 40A corresponding to the teeth of the comb formed by zone 41A alternate with the regions 40B corresponding to the teeth of the comb constituted by zone 41B. The width of regions 40A exceeds that of regions 40B and is e.g. double the width of said regions 40B. Moreover, within the space created by joint 39 and walls 33, 35 is arranged a wall member 43 for subdividing said space into two separate zones 43B, 43C, each of which is shaped like a complementary comb. Thus, the regions 42B corresponding to the teeth of the comb constituted by zone 43B alternate with regions 42C corresponding to the teeth of the comb constituted by zone 43C. The width of regions 42C exceeds that or regions 42B and is e.g. twice the width of said regions 42B.

The wall members 41 and 43 are respectively placed between walls 31, 33 and walls 33, 35, in such a way that each region 40B is superimposed on part of a region 42C and each region 40A is superimposed on the other part of a region 42C and a region 42B.

The different zones 41A, 41B, 43B, 43C are respectively filled with dichroic display materials, e.g. via filling holes 45 e.g. made in the facing walls 31, 35 of said zones. Each of these display materials is constituted by a liquid crystal, e.g. of the nematic or ferroelectric type, and a dye.

Thus, for example, zone 40A contains a display material A, whose dye is chosen in such a way that in the absorbent state the transmission curve T of said material is close to curve T(A) shown in FIG. 3C, or in other words is equal to 1 for radiation of wavelength below 0.5 μm and more particularly for radiation of wavelength between 0.4 and 0.5 μm and is equal to 0 for other radiation levels. Zones 40B and 42B contain a display material B, whose dye is chosen in such a way that in the absorbent state the transmission curve of said material is close to curve T(B) shown in FIG. 3c, or in other words 1 for radiation of wavelength above 0.6 μm and more particularly for radiation of wavelength between 0.6 and 0.7 μm and is zero for other radiation levels. Zone 42C contains a display material C, whose dye is chosen in such a way that in the absorbent state the transmission curve of said material is close to curve T(C) shown in FIG. 3c, or in other words is equal to 1 for radiation of wavelength between 0.5 and 0.6 μm and is zero for the other radiation levels. The wavelengths between 0.4 and 0.5 μm in the visible spectrum correspond to blue, those between 0.5 and 0.6 μm; correspond to green and those between 0.6 and 0.7 μm correspond to red. The relative values 1 to 0 of the transmission curves respectively correspond to transmissions and absorptions.

Thus, in the absorbent state, material A absorbs radiation corresponding to green and read and transmits that corresponding to blue, material B absorbs radiation corresponding to blue and green and transmits that corresponding to red and material C absorbs radiation corresponding to blue and red and transmits that corresponding to green.

Thus, for example, the dye contained in material A can be a blue dye $F_1$ marketed by Merck, the dye contained in material B can be a red dye $F_{263}$ or a mixture of yellow $F_3$ and red $F_2$ dyes marketed by Merck and the dye contained in material C can be a mixture of yellow $F_3$ and green $F_{235}$ dyes marketed by Merck.

In addition, FIG. 3a shows in exemplified manner a multiplexed display. Therefore the excitation of the display materials is obtained by creating an electric field between crossed row and column electrodes. Thus, on the facing faces of walls 31, 33 are respectively arranged row electrodes 31a and column electrodes 33a intersecting with row electrodes 31a and on the facing faces of walls 33 and 35 are arranged column electrodes 33b and row electrodes 35a intersecting with column electrodes 33b. These different electrodes are arranged in such a way that each region 40A faces two column electrodes 33a, each region 40B faces a column electrode 33a, each region 42B faces a column electrode 33b and finally each region 42C faces two column electrodes 33b.

The facing parts of the row and column electrodes form the armatures or coatings of capacitors, whereof the display materials placed between the said parts form the dielectrics. Thus, between walls 31, 33 of the cell are defined a first group of capacitors on the basis of electrodes 31a and 33a and display materials A and B, each region 40A being associated with first and second columns of capacitors of the first group and each region 40B is associated with a single column of capacitors of the first group. Moreover, between the cell walls 33, 35 are defined a second group of capacitors on the basis of electrodes 33b, 35a and display materials B and C, each region 42B being associated with a single column of capacitors of the second group and each region 42C is associated with first and second columns of capacitors of the second group. Thus, for example, the first column of capacitors associated with each region 40A is superimposed on the column of capacitors associated with a region 42B, the second column of capacitors associated with each region 40A is superimposed on the first column of capacitors associated with a region 42C and the column of capacitors associated with each region 40B is superimposed on the second column of capacitors associated with a region 42C.

Each elementary image point 50 of the cell corresponds to the superimposing of a capacitor of the first group and a capacitor of the second group, whose dielectrics are formed by different display materials. The display cell according to the invention consequently has three different types of elementary image points respectively corresponding to the superimposing of materials A-B, materials A-C and materials B-C. One image point 52 of the cell is consequently defined by three adjacent elementary image points of different types e.g. corresponding to the superimposing of materials A-B, A-C and B-C.

The following table gives the different states obtained with the screen according to the invention, for the three elementary image points constituting an image point of the screen. State 1 corresponds to an absorbent state, or in other words as a function of the dichroic display material, certain wavelengths are transmitted and others are absorbed, whilst state 0 corresponds to a total transmission of the wavelengths.

TABLE

| elementary image points | states 0-0 | 1-0 | 0-1 | 1-1 |
| --- | --- | --- | --- | --- |
| A - B | white | blue | red | black |
| A - C | white | blue | green | black |
| B - C | white | red | green | black |

Thus, for example, when display materials A-B are superimposed and are respectively in a conductive state (state 0), the color resulting from this superimposing is white. When material A is in an absorbing state (state 1)1 and material B in a conductive state, only material A absorbs light radiation, sot hat the resulting color is blue. When material A is in a conductive state and material B in an absorbing state, only material B absorbs light radiation, so that the resulting color is red. When the two superimposed colors A and B are in an absorbing state, material A absorbs radiation corresponding to green and red and material B absorbs radiation corresponding to blue and green, sot hat the resulting color is black.

Thus, it is apparent from the table that when two display materials are superimposed and are both in a conductive state the resulting color is white. When they are both in an absorbent state, the resulting color is black and when only one of these superimposed display materials is in an absorbent state, the resulting color is that transmitted by said display material.

It can also be seen from this table that as a result of the reciprocal arrangement of the display materials (each display material of an image point being associated with two elementary image points), each color blue, red or green can be displayed on two elementary image points. The screen according to the invention can therefore display one of these colors on ⅔ of an image point instead of ⅓ for additive screens, each color resulting from the superimposing of two display materials. instead of three in the subtractive type screens. The screen according to the invention consequently has a better luminous efficiency than that encountered in additive or subtractive screens, which makes it possible to use the screens according to the invention both in the reflective and in the transmissive mode.

In the reflective mode, a reflector is necessary for the cell. When an observer looks at the cell, e.g. from wall 31, the reflector is e.g. placed on the outer or inner face of wall 35 or is constituted by said wall 35. In the reflective mode, all the walls located upstream of the reflector are transparent and in the transmissive mode, whilst all the cell walls are transparent.

FIG. 3a shows a multiplexed display, but as a function of the liquid crystal type used in the screen according to the invention, it can obviously be more advantageous, as shown hereinbefore to use a non-multiplexed display, e.g. like that shown in FIG. 4.

The cell shown in FIG. 4 differs from that of FIG. 3a by the nature of the dichroic display materials and the type of display used. In this cell, the display materials are constituted by polymers having bubbles containing a liquid crystal mixed with a dye. As a result of the solid structure of the polymers, said cell neither requires wall members for subdividing the display materials in pairs, nor sealing joints, as in the case with FIGS. 3a and 3b.

Thus, between walls 31, 33 are placed a display material A' and a display material B', each being in the form of a complimentary comb. Between walls 33 and 35 are placed a display material B' and a display material C', each having the form of a complimentary comb.

Reference 45A' is used for designating the regions or teeth of the comb corresponding to the display material A' placed between the facing faces of walls 31 and 33, 45B' is used for the regions or teeth of the comb corresponding to the display material B' placed between the facing faces 31, 33, 47B' for the regions or teeth of the comb corresponding to the display material B' placed between the facing faces of walls 33, 35 and 47C' for the regions or teeth of the comb corresponding to the display material C' placed between the facing faces of walls 33, 35.

Each region 45B' is superimposed on part of a region 47C' and each region 45A' is superimposed on the other part of a region 47C' and a region 47B'. The width of the regions 45A' and 47C' is e.g. equal to twice the width of regions 45B' and 47B'.

The dyes of the display materials A', B' and C' are e.g. of the same type as those of the display materials A, B and C described hereinbefore relative to FIGS. 3a, 3b and 3c.

Moreover, FIG. 4 shows a non-multiplexed display type. This display used continuous electrodes and point electrodes.

Thus, for example, on the facing faces of walls 33 and 31 are respectively arranged a continuous electrode 33c and point electrodes 31c, whilst on the facing faces of walls 35 and 33 are respectively arranged point electrodes 35c and a continuous electrode 33e.

The point electrodes 31c are arranged in such a way that each region 45B' faces a column of point electrodes 31c and each region 45A' faces two columns of point electrodes 31c. THe point electrodes 35c are positioned in such a way that each region 47B' faces a column of point electrodes 35c and each region 47C' faces two columns of point electrodes 35c.

Each point electrode 31c, 35c is connected in known manner to a row conductor and a column conductor (not shown) by means of a not shown transistor, such as a thin film transistor, so that e.g. when the electric signal carried by the corresponding column conductor brings about the conductive or on state of the transistor, the electric signal carried by the row conductor is transmitted to the point electrode. Moreover, the continuous electrodes are at reference potential.

Each point electrode and that part of the continuous electrode which faces the point electrode constitute the coatings of a capacitor and the display material placed between these coatings of a capacitor and the display material placed between these coatings forms the dielectric of said capacitor. Thus, as hereinbefore, between the cell walls 31, 33 is defined a first group of capacitors and between walls 33, 35 a second group of capacitors, each region 45B' and 47B' being associated with a single column of capacitors respectively of the first and second groups and each region 45A' and 47C' is associated with a first and second columns of capacitors respectively of the first and second groups. Thus, for example, as hereinbefore, the first column of capacitors associated with each region 45A' is superimposed on the column of capacitors associated with a region 47B', the second column of capacitors associated with each region 45A' is superimposed on the column of capacitors associated with a region 47B', the second column of capacitors associated with each region 45A' is superimposed on the first column of capacitors associated with a region 47C' and the column of capacitors associated with each region 45B' is superimposed on the second column of capacitors associated with a region 47C'. In the same way as hereinbefore, an elementary image point of the cell is constituted by the superimposing of a capacitor of the first family with a capacitor of the second family, whose display materials differ and an image point of the cell corresponds to three adjacent elementary image points, each of said elementary image points corresponding to a different superimposing of the display materials, e.g. A'-B', A'-C' and B'-C'.

It is obviously also possible to use with the screen according to the invention other non-multiplexed display modes, like that described in French patent application 2 553 218.

The type of display used (multiplexed or non-multiplexed) is dependent on the nature of the liquid crystals used (nematic or ferroelectric) and its molecular arrangement in the cell. Furthermore, it is possible to use with the screen according to the invention, a multiplexed or non-multiplexed display both with display materials of the type described in FIGS. 3a to 3c and display materials of the type described in FIG. 4.

In screens according to the invention, in order to avoid parallax effects, wall 33 is thinner than walls 31 and 35. For example, walls 31 and 35 have a thickness of approximately 1 mm, whilst wall 33 has a thickness equal to or below 100 μm and each display materials has a thickness of approximately 1 to 20 μm.

FIG. 5 diagrammatically shows an exploded view of part of a display cell according to the invention, whose dichroic display materials comprise a ferroelectric liquid crystal.

For reasons of simplicity, molecules of ferroelectric liquid crystal and dye are only shown for a single elementary image point corresponding, as shown hereinbefore, to the superimposing of two capacitors, whose dielectrics are respectively formed by two separate display materials, e.g. A and B. The coatings of these capacitors are e.g. respectively formed by the facing parts of a row electrode 31a and a column electrode 33a and by the facing parts of a column electrode 33b and a row electrode 35a.

In addition, said cell is associated with a polarizer 51, e.g. placed above wall 31 and whose direction is designed by arrow 53.

The molecules of the ferroelectric liquid crystal 55, 56 and dye 57, 58 of materials A and B are in a planar configuration, as described hereinbefore.

If an electric field is established between two electrodes, e.g. 33a and 31a, such that the axis of the liquid crystal and dye molecules 55, 57 is oriented between said electrodes parallel to the direction of the polarizer, the corresponding display material is then in an absorbent state. However, on establishing a reverse polarity electric field between two electrodes, e.g. 33b and 35a, the axis of the liquid crystal and dye molecules 56, 58 is oriented between these electrodes perpendicular to the direction of the polarizer 51, so that the corresponding display material is then in a conductive state.

Between the two conductive and absorbing states, the liquid crystal and dye molecules form an angle $2\theta$ of approximately 90°.

It is obviously possible to produce screens according to the invention incorporating ferroelectric liquid crystals with multiplexed display modes other than that shown in FIG. 5, or non-multiplexed display modes. Moreover, these ferroelectric liquid crystals can be in a polymer, as described relative to FIG. 4.

The above description is given in a non-limitative manner and numerous variants are possible without passing beyond the scope of the invention. Moreover, the screens according to the invention are compatible with all orientation methods and surface treatment methods of known screens, such as e.g. monochrome screens. They can also be realized for large display surfaces.

We claim:

1. A polychrome screen comprising:
   a first layer comprised of alternating regions of first and second dichroic display materials positioned between first and second insulating walls;
   a second layer comprised of alternating regions of the second dichroic display material and a third dichroic display material positioned between the second wall and a third insulating wall;
   wherein the first and second layers are superimposed such that each region of the first material of the first layer is juxtaposed to both a region of the second material of the second layer and to a part of a region of the third material of the second layer and wherein each region of the second material of the first layer is juxtaposed to the other part of a region of the third material of the second layer;
   wherein the first, second and third insulating walls are each provided with electrodes;
   wherein an image point of the screen is defined by three elementary image points respectively formed by superimposing first, second and third adjacent capacitors at the first layer, formed between the electrodes of the first and second insulating walls, with first, second and third adjacent capacitors of the second layer, formed between the electrodes of the second and third insulating layers;
   wherein a dielectric of the first and second capacitors of the first layer is comprised of the first material of the first layer and by the second material of the first layer for the third capacitor;
   wherein a dielectric of the first capacitor of the second layer is comprised of the second material of the second layer and by the third material of the second layer for the second and third capacitors.

2. Polychrome screen according to claim 1, wherein each display material (A', B', C') is constituted by a polymer capsule (48) containing a liquid crystal mixed with a dye.

3. Polychrome screen according to claim 1, wherein: each display material (A, B, C) is constituted by a liquid crystal mixed with a dye, a first tight wall member (41) is located between the first and second insulating walls (31, 33) for separating the first and second display materials (A, B), and a second tight wall member (43) is located between the second and third insulating walls (33, 35) for separating the third and fourth display materials (B, C), and first and second sealing joints (37, 39) are placed respectively around the first and second walls and around the second and third walls.

4. Polychrome screen according to either of the claims 2 and 3, wherein the liquid crystal used is of the nematic type.

5. Polychrome screen according to either of the claims 2 and 3, wherein the liquid crystal used is ferroelectric.

6. Polychrome screen according to claim 5, wherein the liquid crystal used is of the chiral smectic C type.

7. Polychrome screen according to claim 6, further comprises a single polarizer.

8. Polychrome screen according to claim 1, wherein, in an absorbent state, the first material (A, A') absorbs radiation corresponding to green and red and transmits radiation corresponding to blue, the second material (B, B') absorbs radiation corresponding to blue and green and transmits radiation corresponding to read and the third material (C, C') absorbs radiation corresponding to blue and red and transmits radiation corresponding to green.

9. A polychrome screen according to claim 1, wherein the alternating regions of the first layer are formed by a first serpentine wall which separates the first and second materials of the first layer, and wherein the alternating regions of the second layer are formed by a second serpentine wall which separates the second and third materials of the second layer.

10. A polychrome screen according to claim 9, wherein the first serpentine wall divides the first layer into at least first and second spaces for respectively containing the first and second materials of the first layer, and wherein the second serpentine wall divides the second layer into at least third and fourth spaces for respectively containing the second and third materials of the second layer.

11. A polychrome screen according to claim 10, wherein the first and second spaces of the first layer are comb-shaped and complementary to one another and wherein the third and fourth spaces of the second layer are comb-shaped and complementary to one another.

12. A polychrome screen according to claim 5, further comprising a single polarizer.

* * * * *